Jan. 22, 1963 W. E. SLAVENS 3,074,412
CORN HUSKING MECHANISM
Original Filed Oct. 3, 1957 4 Sheets-Sheet 1
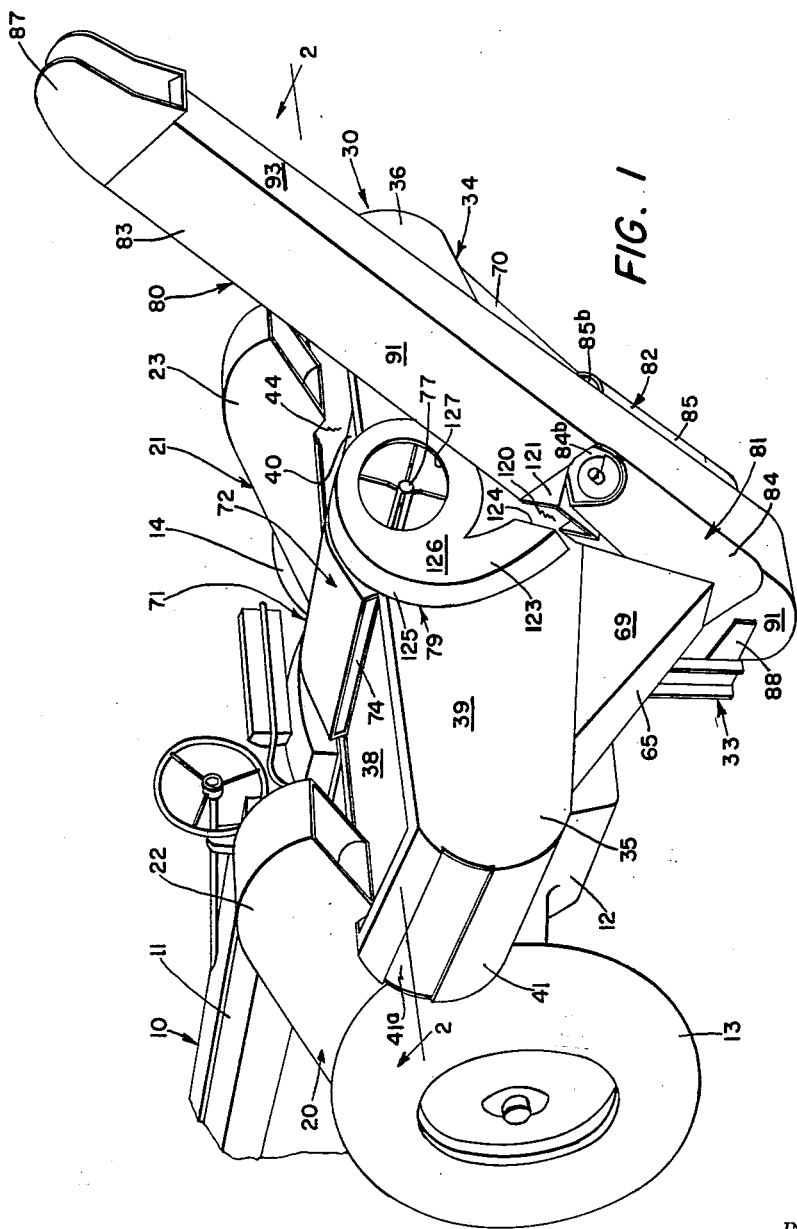
INVENTOR.
WAYNE E. SLAVENS
ATTORNEYS

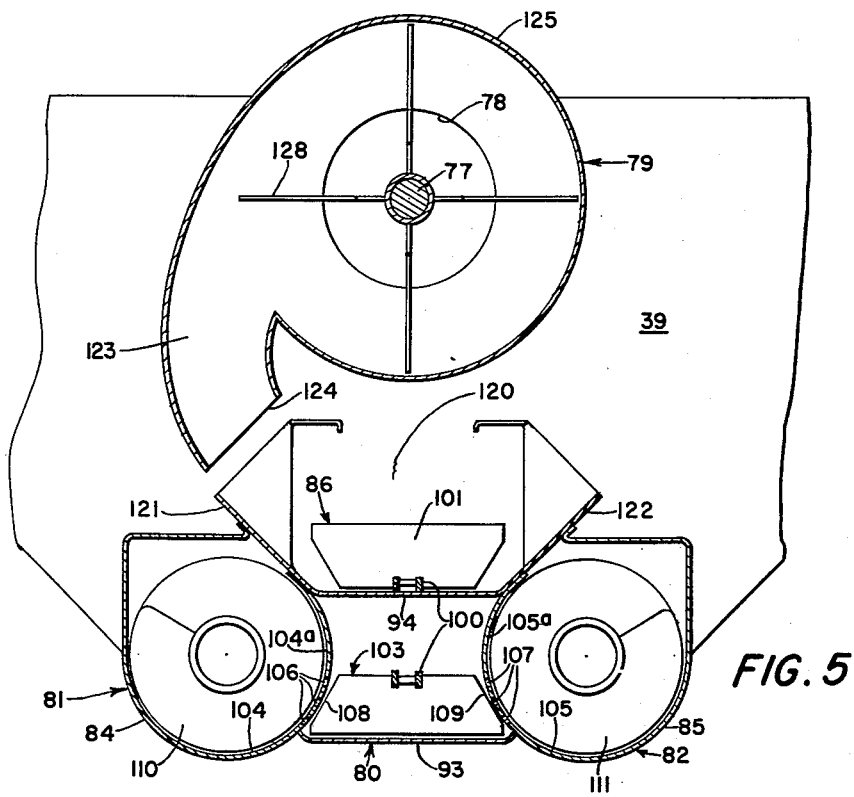
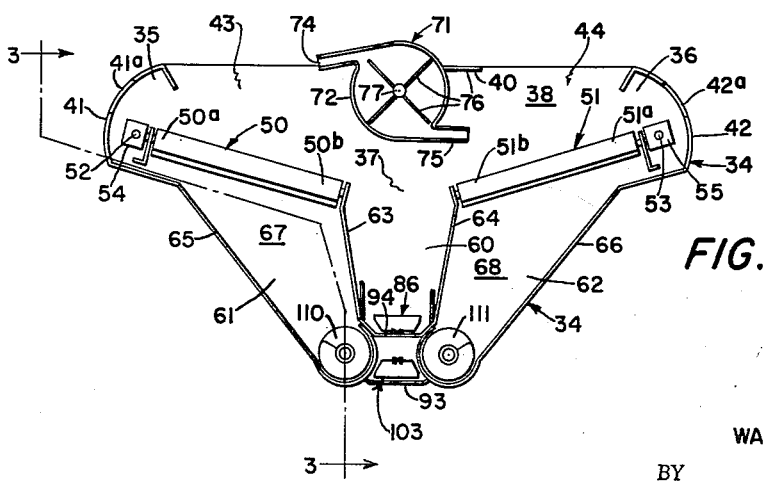
FIG. 5
FIG. 2
INVENTOR.
WAYNE E. SLAVENS
BY
ATTORNEYS

INVENTOR.
WAYNE E. SLAVENS
ATTORNEYS

United States Patent Office 3,074,412
Patented Jan. 22, 1963

3,074,412
CORN HUSKING MECHANISM
Wayne E. Slavens, Des Moines, Iowa, assignor, by mesne assignments, to Deere & Company, a corporation of Delaware
Continuation of application Ser. No. 687,968, Oct. 3, 1957. This application Jan. 4, 1960, Ser. No. 450
17 Claims. (Cl. 130—5)

This invention relates to a crop harvester and more particularly to the crop treating unit incorporated in the harvester. Still more particularly the invention relates to discharge conveyor means on the harvester for removing trash and the treated or harvested crop.

This is a continuation of application, Ser. No. 687,968, filed October 3, 1957, which is now abandoned.

A corn harvester normally comprises a mobile frame having means at the forward end for detaching the ears of corn from standing stalks. The ears are normally fed rearwardly to a crop treating unit, in most cases a husking unit, in husked covered condition. The crop treating or husking mechanism conventionally comprises one or more pair of cooperating husking rolls which operate to grasp the husks from the ears and to drive them downwardly beneath the husking mechanism. In the past it has been the normal procedure to provide an auger type conveyor running parallel to the husking rolls which feed the husks outwardly from the harvester.

In the type of corn harvester, herein to be described, the mobile frame is in the form of a tractor body and includes a pair of row or harvester units on opposite sides of the body which feed harvested ears of corn to a transverse husking unit at the rear of the tractor. The husking unit includes a pair of elongated and longitudinally alined husking assemblies which receive the ears of corn adjacent the outer ends of the husking assemblies and feed them inwardly to a centrally located discharge end. In the past the husking discharge augers or conveyors normally receive the husks and drive them outwardly relative to the longitudinal center line of the tractor and harvester assembly, there to be discharged on the ground. It is contemplated and it is the object of the present invention to provide a husk discharge auger means positioned transverse to the husking rolls and which feeds the husks transversely relative to the longitudinal dimension of the husking rolls. Panel or hopper means will be positioned under the husking rolls to feed the husks to one end of the auger means.

It is still a further object of this invention to provide a new and novel method of discharging both the husks and the ears of corn featuring a centrally located ear conveyor transverse to the husking rolls and a pair of adjacent outer auger conveyors, both being transverse to the husking rolls and having in common with the central ear conveyor perforated wall portions. The augers contained in the outer auger housings drive the husks adjacent to the perforated wall portions to permit the incidental kernels of corn which have been shelled both in the harvesting and husking operation to fall through the perforations and be collected in the central corn or ear conveyor.

It is the further object of this invention to provide in the above described conveyor means a blower connected to or is mounted on the husking mechanism directing a flow of air into the central corn conveyor following its receiving the kernels from the husk conveyors and over the mixture of ears and kernels so as to drive the chaff and other remaining foreign matter from the corn. In the present form of the invention, the blower is an extension of the blower means associated with the husking operation.

Other objects and advantages of the present invention will become apparent to those skilled in the art as the nature of the invention is better understood from the following detailed description and as shown in the accompanying drawings.

FIG. 1 is a rear perspective view of the rear portion of a tractor and corn harvester assembly.

FIG. 2 is a vertical sectional and schematic view taken substantially along the line 2—2 of FIG. 1.

FIG. 5 is an enlarged sectional view taken substantially along the line 5—5 of FIG. 3.

Figure 3:
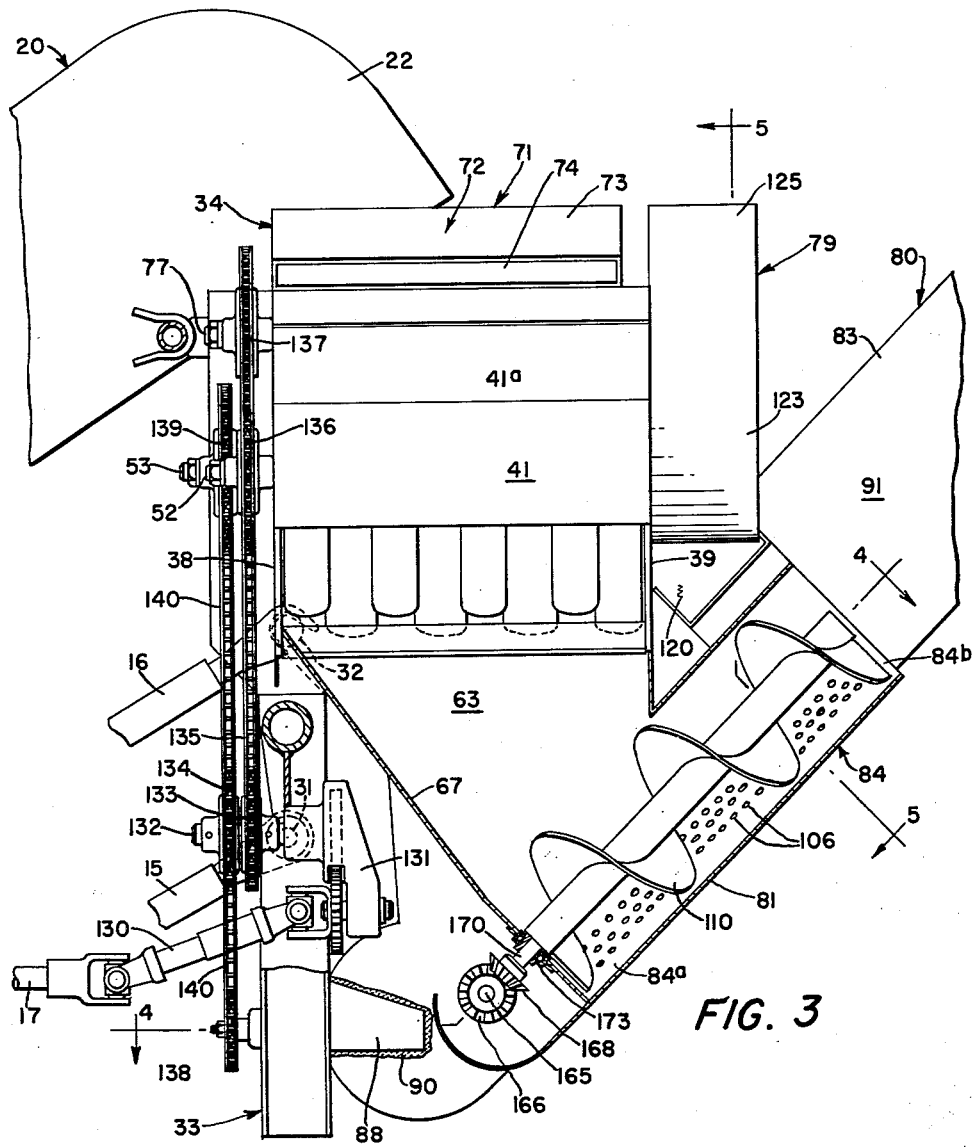
FIG. 3 is an enlarged sectional view taken substantially along the line 3—3 of FIG. 2.

The harvester assembly herein to be described includes a tractor 10 having an elongated body 11, an axle and transmission assembly 12, a pair of front supporting wheels, not shown, and rear wheels 13, 14. Other details of the tractor, such as the draft type linkage indicated in FIG. 3 by lower parallel links 15, the left link only being shown, and an upper link 16, and a power take-off shaft 17, are shown only partially. The harvester herein to be described is a corn harvester and the treating unit associated therewith is a husking unit. However, it should be recognized that such is for illustrative purposes and that many features of the present invention would operate successfully with other types of harvesters and treating units.

The harvester includes a pair of forwardly extending harvester row units 20, 21 positioned on opposite sides of the tractor body 11 and between the tractor body 11 and the respective left and right rear wheels 13, 14. The row units 20, 21 contain therein means for aggressively detaching the ears of corn from the stalks and corn elevator portions, indicated in their entirety by reference numerals 22, 23 respectively, which feed the ears of corn rearwardly to be discharged. The harvester row units are more or less conventional and may be similar to those shown and described in assignee's pending application, Ser. No. 666,670, filed June 19, 1957.

Positioned beneath the discharge ends of the elevators 22, 23 is the husking mechanism indicated in its entirety by the reference numeral 30. The husking mechanism is mounted on the tractor links 15, 16 by means of horizontal pivot shafts 31, 32 which are part of a main frame 33. The exact details of the frame 33 are unimportant for purposes of this invention and are described only generally and for purposes of orientation. A more detailed explanation, if desired, may be had by reference to the aforementioned pending application Ser. No. 666,670. The husking mechanism is comprised of a housing structure 34 rigid with the main frame 33 and treated as a part thereof. The housing structure 34 is positioned to the rear of the row units 20, 21 and has outer end portions 35, 36 adjacent to and for receiving ears of corn from the discharge ends 22, 23 respectively of the row units. A central portion 37 of the housing structure is positioned inwardly of the outer end portions 35, 36 and directly to the rear of the tractor body 11. The housing structure 34 is composed of front and rear transverse vertically disposed panels 38, 39 interconnected by an upper central and horizontal panel 40 and curved end panels 41, 42. As may be seen from FIG. 2, the end panels 38, 39 are spaced transversely from the central panel 40 to form ear-receiving openings 43, 44 adjacent and proximate to the discharge ends of the elevators 22, 23.

Positioned inwardly of the housing structure 34 is a pair of inclined husking units 50, 51. The husking units 50, 51 have crop receiving ends 50a and 51a respectively adjacent respective end portions 35, 36 of the housing structure and beneath the ear receiving openings 43, 44 respectively. The husking units 50, 51 are inclined to feed ears of corn inwardly to discharge ends 50b and 51b. The discharge ends 50b and 51b are proximate to one another and are spaced apart transversely to permit the ears of corn to be fed over the ends 50b and 51b in a substantially single stream of corn at the central portion 37 of the housing structure. Adjacent the crop receiving ends 50a and 51a are drive mechanisms 54, 55 respectively consisting of elongated fore-and-aft extending gear housings which house suitable series of beveled gears, not shown, part of which are mounted on drive shafts 52, 53, and mesh with beveled gears, also not shown, mounted on the individual husking rolls making up the husking units 50, 51. Husking units 50, 51 and their associated drives 54, 55 are generally conventional, such being shown, for example, in the aforementioned pending application Ser. No. 666,670. Consequently, while details of the husking units and their associated gear drives have not been shown or described in detail, if such is desired reference may be had to the pending application.

Positioned beneath the husking units 50, 51 are a series of three hoppers including a central corn hopper 60 and two outer husk hoppers 61, 62 adjacent to and on opposite sides of the central hopper 60. The hoppers 60-62 are formed by transversely spaced panel means 63, 64, forming the inner sides of the outer hoppers 61, 62 and separating them from the central hopper 60 and outer inclined panels 65, 66 which are part of the housing structure 34 and extend downwardly and inwardly from an upper end adjacent to the lower edge of the curved end panels 41, 42. Other panel means forming the hoppers 61, 62 are front panels 67, 68 at the forward sides of the end hoppers 61, 62 respectively and rear panels 69, 70 at the rear of the hoppers. The central hopper 60 is formed, as previously mentioned, by the panels 63, 64 at its sides and a lower continuation of the forward panel 38 at its forward side.

Also included as a part of the husking mechanism 33 is a blower means indicated in its entirety by reference numeral 71. The blower means 71 includes a main central blower 72 extending between the front panel 38 and rear panel 39. The blower 72 further includes a blower housing 73 having a pair of blower outlets 74, 75 which directs the air issuing from the blower over the husking units 50, 51 respectively. Openings 41a, 42a are provided in the end panels 41, 42 to permit the air and trash to leave the husking mechanism. The fan itself is of conventional design and includes four fan blades 76 mounted on a rotatable drive shaft 77. An air intake opening 78 (FIG. 5) is provided in the rear panel 39 for purposes of feeding air to the fan. A blower extension 79, later to be described in detail, is supported on and extends rearwardly from the rear panel 39.

Positioned beneath the central hopper 60 and for receiving the ears of corn issuing over the discharge ends 50b, 51b of the husking units 50, 51 is the lower end of a wagon elevator 80. The wagon elevator 80 operates in conjunction with a pair of husk conveyors 81, 82 as discharge means for the husking mechanism 33, the central elevator 80 discharging the corn and the husk conveyors 81, 82 discharging the husks and other waste material gathered in the husking operation. The entire discharge means is a rigid unit and includes the corn elevator discharge housing 83 and a pair of adjacent and rigidly connected auger housings 84, 85. The auger housings 84, 85 have lower husk intake openings 84a, 85a and upper discharge outlets 84b, 85b rearwardly remote from the openings 84a, 85a. The wagon elevator 80 is more or less of a conventional type being a flight type chain conveyor, the upper flight or run 86 operating to move the ears of corn upwardly and rearwardly to a discharge end 87 of the elevator. The elevator housing 83 is mounted on the main frame 33 by means of rearwardly extending brackets 88, 89 welded, as at 90, to the sides of the elevator housing. There are upper and lower plates, only the lower being identified at 93, interconnecting the upper and lower edges of the side plates 91, 92. Also, there is an intermediate plate 94 positioned beneath the upper flight 86. The elevator 80 further includes the conventional type chain 100, having fore-and-aft spaced apart flights 101, mounted to drive over a drive sprocket 102. As previously mentioned the chain conveyor includes an upper run 86 which moves the corn rearwardly and a lower return run 103. The upper run 86 moves over the intermediate plate or panel 94 and the lower run 103 moves over the lower plate or panel 93.

As shown in FIG. 2, the auger or husk conveyors 81, 82 are positioned at the discharge portion of the hoppers 61, 62 and receive the husks being discharged through the husking units 50, 51. Auger housings 84, 85 are rigid with the wagon elevator housing 83 and have partial cylindrical wall portions 104, 105 respectively with parts 104a, 105a thereof being common with and forming a part of the side of the wagon elevator 80. As may be seen clearly from FIGS. 4 and 5, each of the auger housings 84, 85 therefore have at least one common wall portion with the wagon elevator housing 83. The portions 104a, 105a are perforated as at 106, 107 respectively to permit kernels of corn to pass from the auger housings to the elevator housing. In order to accommodate the curved wall portions 104a, 105a of the auger housings 84, 85, the flight members 101 are cut away, as at 108, 109, to permit passage of the flights adjacent to and proximate to the respective auger housing portions 104a, 105a. The auger housings 84, 85 contain augers 110 and 111 respectively to convey the husks rearwardly to be discharged clear of and in a rearward direction from the husking unit.

Adjacent to the rear panel 39 of the housing structure 34 and directly beneath the blower extension 79 is an opening 120 in the upper section of the corn elevator 80. At the opening, there is provided a pair of funnel structures 121, 122 flaring upwardly and outwardly from the laterally disposed panel 94. The blower extension 79 includes a short duct portion 123 having a lower end 124 driving the blast of air issuing from the blower extension 79 through the left funnel 121 and across the upper flight or run 86 and out the right funnel 122. The blower extension 79 includes a conventional shaped circular or cylindrical housing 125 enclosed at its front by the rear panel 39 of the housing structure 34 and at its rear by a housing panel 126 having a large circular opening 127 to permit entrance of air into the fan extension. The blower extension 79 also includes conventional type fan blades 128 mounted on an extension of the blower drive shaft 77. In effect, therefore, the blower means, which includes the forward or main blower means 72 and the blower extension 79, is a single unit with only a panel 39 separating the front or main and rear or extension portions thereof.

Power for the husking mechanism is obtained through a drive which receives its power from the power take-off shaft 17 of the tractor. The drive includes a rearwardly extending drive shaft 130 connected at its rear end to a gear transmission, indicated in its entirety by the reference numeral 131, serving to transmit the power to a forwardly projecting counter-shaft 132. Mounted on the counter-shaft 132 is a pair of pinion sprockets 133, 134. The rear sprocket 134 drives the left husking unit 50 by means of a chain 135 extending upwardly to a drive sprocket 136 fixed to the husk unit drive shaft 52 and a drive sprocket 137 fixed to the lower drive shaft 77. The forward pinion sprocket 133 serves to drive a lower sprocket 138 and an upper drive sprocket 139, the latter being fixed to the husk unit drive shaft 53. Both sprockets 138 and 139 are driven by an agricultural type link chain 140.

Figure 4:
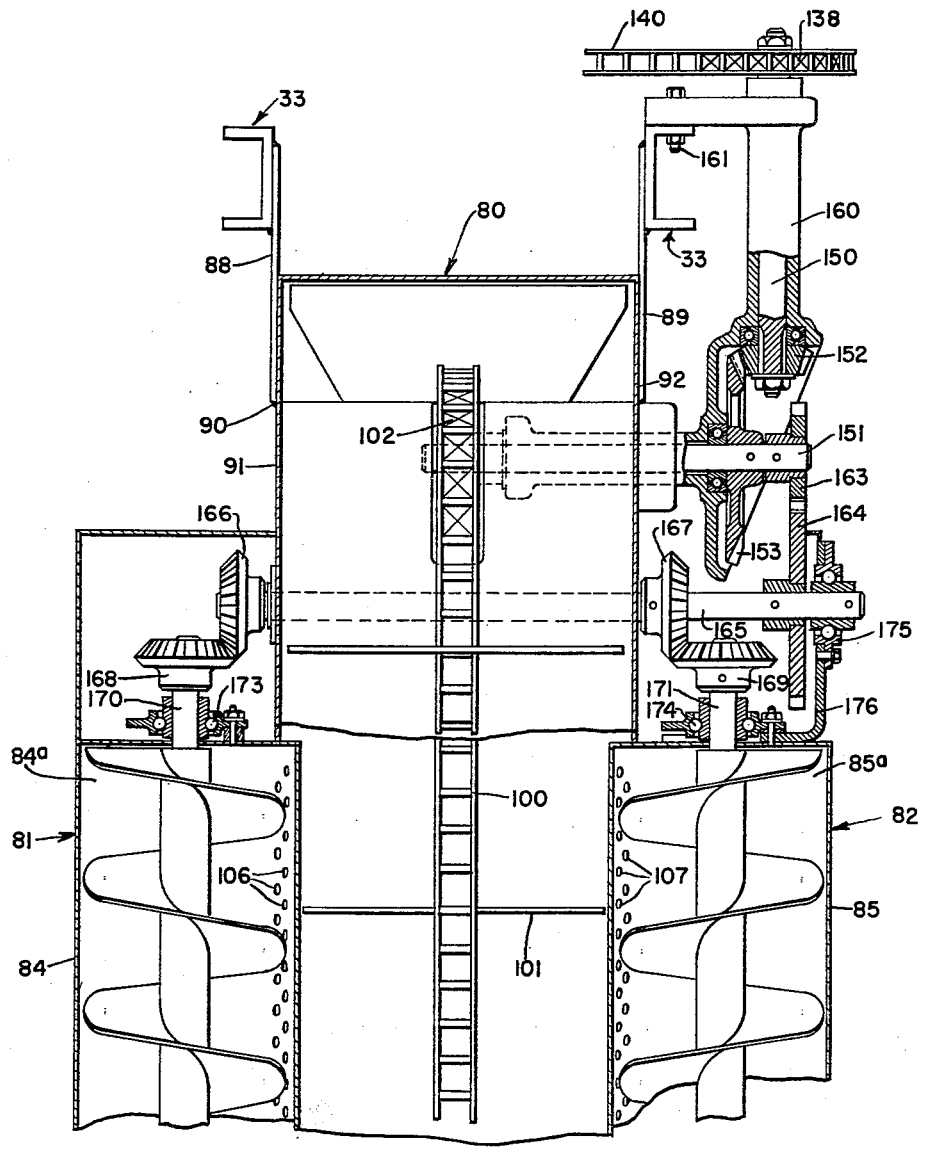
FIG. 4 is an enlarged sectional view taken substantially along the line 4—4 of FIG. 3.

Referring now to FIG. 4, the drive for the three conveyors or elevators 80, 81, 82 is driven from the drive sprocket 133 fixed to a fore-and-aft extending shaft 150. The shaft 150 drives a transverse wagon elevator drive shaft 151 by means of a beveled pinion 152 and gear 153. The shafts 150, 151 are supported by a journal casting 160 bolted to the frame 33 as indicated at 161. On one end of the shaft 151 is mounted the chain sprocket 102 which drives the chain conveyor 100 in the wagon elevator. On the opposite end of the shaft 151 is mounted a pinion 163 meshing with a gear 164 pinned to a transverse drive shaft 165 extending through and supported by the side plates 91, 92 of the elevator housing. Adjacent to the side plates 91, 92 and mounted on the shaft 165 is a pair of beveled pinions 136, 137 respectively which mesh with respective beveled gears 138, 139 respectively fixed to auger drive shafts 170, 171. The shafts 170, 171 are journaled at the lower end of the auger housings 84, 85 by bearings 173, 174. The drive shaft 165 is further supported for rotation on the lower end of the right auger housing 85 by means of a bearing 175 mounted on a bracket 176 fixed to the lower end of the conveyor housing 85.

The husking mechanism will operate in the following manner. As the corn is discharged from the rear of the row units 20, 21 it is received on the outer ends 50a, 51a of the husking units 50, 51 and fed inwardly, due to the inclination of the husking units, 50, 51, to be discharged over the inner or discharged ends 50b, 51b of the husking units. The husking units, in conventional manner, operate to discharge downwardly husks resulting from the husking operation from where the husks are gathered by the hoppers 67, 68 and fed inwardly and downwardly to the central portion 37 of the housing structure, there to be discharged into the husk conveyors 81, 82. At the same time that the husks are fed inwardly to the husk conveyors 81, 82, the ears of corn are collected in the central hopper 60 and move onto the upper flight 86 of the chain conveyor from where they are moved upwardly and rearwardly to an awaiting wagon or similar container.

In the harvesting operation of the forwardly extending row units 20, 21 there is normally collected a quantity of prematurely shelled corn that is discharged into the husking mechanism. Also the operation of the husking rolls causes a number of kernels to be dislodged from the ears. The kernels fall through the husking units 50, 51 and are collected in the hoppers 61, 62. As a result there is a commingled mixture of kernels of corn and husks fed into the auger conveyors 81, 82. The augers 110, 111 operate to move the husks and kernels against the perforated wall portions 104a and 105a common to the auger housings and the corn conveyor housing. The kernels of corn pass through the perforations 106, 107 of the wall portions and into the central or corn conveyor 80. The kernels of corn fall against the lower panel 93 or the flight members 101 of the lower or return run 103 drives them first forwardly to the toe end of the discharge elevator and then upwardly and rearwardly over the laterally disposed panel 94 and to the discharge end 87 of the wagon elevator. As previously explained the blower extension 79 directs a blast of air over the kernels and ears for final cleaning prior to collection in the wagon or similar conveyor.

While only one form of the invention has been shown, it should be recognized that other forms and variations could exist without departing basically from the broad general principles herein disclosed. It should therefore be understood that while the preferred form of the invention is set forth with the view of clearly and concisely illustrating its principles, it is desired not to limit or narrow the invention beyond that which is broadly claimed.

What is claimed is:

1. Corn treating mechanism comprising: housing structure having opposite end portions and a central portion; a pair of elongated treating units mounted on the structure and extending respectively from the opposite end portions to the central portion, each of the treating units having a crop-receiving end adjacent its respective end portion and a crop discharge end adjacent the central portion, and each of the treating units being operative to discharge downwardly trash and incidental kernels of corn resulting from the treating operation and to feed treated corn from its crop-receiving end to its discharge end; blower means mounted on the central portion of the housing structure directing a flow of air over the treating units and including a blower extension outwardly of the housing structure; panel means in said housing structure forming a central hopper and a pair of outer hoppers adjacent opposite sides of the central hopper and beneath the treating units, the central hopper opening upwardly to receive the ears leaving the discharge ends of the treating units and the outer hoppers opening upwardly to receive trash from the treating units and operative to feed the trash inwardly towards the central portion of the housing structure; discharge means connected to the housing structure adjacent its central portion including a central conveyor housing and a pair of outer auger housings, each of the outer housings have at least one wall portion common with the central housing with the respective wall portion being perforated to permit passage of kernels of corn between adjacent housings, the outer auger housings opening into and receiving trash and kernels of corn from the outer hoppers, and the central conveyor housing opening into and receiving the treated corn from the central hopper; a pair of augers in the respective pair of auger housings operative to move the trash and kernels adjacent the perforated wall portions to permit the kernels to pass through the portions and into the central conveyor; a conveyor in the central housing for moving the treated corn and kernels from the treating unit; and means between the blower extension and the central conveyor for directing a blast of air over the treated corn and kernels for driving chaff and other foreign matter therefrom.

2. Corn treating mechanism comprising: housing structure having opposite end portions and a central portion; a pair of elongated crop treating units mounted on the structure and extending respectively from the opposite end portions to the central portion, each of the corn treating units having a crop-receiving end adjacent its respective end portion and a crop discharge end adjacent the central portion, and each of the corn treating units being operative to discharge downwardly trash and incidental kernels of corn resulting from the treating operation and to feed treated corn from its crop-receiving end to its discharge end; panel means in said housing structure forming a central hopper and a pair of outer hoppers adjacent opposite sides of the central hopper and beneath the treating units, the central hopper opening upwardly to receive the corn leaving the discharge ends of the treating units and the outer hoppers opening upwardly to receive trash from the treating units and operative to feed the trash inwardly toward the central portion of the housing structure; discharge means connected to the housing structure adjacent its central portion including a central conveyor housing and a pair of outer auger housings, each of the outer housings having at least one wall portion common with the central housing with the respective wall portion being perforated to permit passage of kernels of corn between adjacent housings, the outer auger housings opening into and receiving trash and kernels of corn from the outer hoppers, and the central conveyor housing opening into and receiving treated corn from the central hopper; a pair of augers in the respective pair of auger housings operative to move the trash and kernels adjacent the perforated wall portions to permit the kernels to pass through the portions and into the central conveyor; and a conveyor in the central housing for moving both the treated corn and kernels from the husking unit.

3. Corn treating mechanism comprising: housing structure having opposite end portions and a central portion; a pair of elongated treating units mounted on the structure and extending respectively from the opposite end portions to the central portion, each of the treating units having a crop-receiving end adjacent its respective end portion and a crop discharge end adjacent the central portion, and each of the treating units being operative to discharge downwardly trash and incidental kernels of corn resulting from the treating operation and to feed corn from its crop-receiving end to its discharge end; panel means in said housing structure forming a central hopper and a pair of outer hoppers adjacent opposite sides of the central hopper and beneath the treating units, the central hopper opening upwardly to receive the ears leaving the discharge ends of the treating units and the outer hoppers opening upwardly to receive trash from the treating units and operative to feed the trash inwardly toward the central portion of the housing structure; discharge means connected to the housing structure adjacent its central portion including a central conveyor housing and a pair of outer auger housings, each of the housings being disposed transverse to the lengthwise dimension of the treating units, each of the outer housings having at least one wall portion common with the central housing with the respective wall portion being perforated to permit passage of kernels of corn between adjacent housings, the outer auger housings opening into and receiving trash and kernels of corn from the outer hoppers, and the central conveyor housing opening into and receiving treated corn from the central hopper; a pair of augers in the respective pair of auger housings operative to move the trash and kernels adjacent the perforated wall portions to permit the kernels to pass through the portion and into the central conveyor; and a conveyor in the central housing for moving the treated corn and kernels from the treating unit.

4. A corn treating unit including a pair of elongated treating mechanisms alined longitudinally and operative to separate trash from the corn, each of the treating mechanisms having respective discharge ends in proximate and spacial relation to the discharge end of the other treating mechanism, and each of the treating mechanisms being inclined to feed the ears to its discharge end; a corn elevator transverse to the treating mechanism and positioned beneath the discharge ends for receiving the ears from the treating mechanisms and including therein an elongated elevator housing having vertically disposed side walls interconnected by vertically spaced laterally disposed walls and a conveyor contained within the housing; a pair of conveyor housings having trash intake openings and rigid with and on opposite sides of the elevator housing, each of the conveyor housings including as a part thereof a portion of the vertically disposed side walls, and each of the latter portions containing perforations therein for passing kernels of corn from the conveyor housings to the elevator housing; a conveyor means within the conveyor housings operative to move the trash and incidental kernels transversely relative to the treating mechanism and adjacent the perforated portion of the side walls; and hopper means beneath each of the respective pair of treating units receiving trash and the incidental kernels from the pair of husking mechanisms and feeding them to the respective conveyor housings.

5. A corn treating unit including a pair of elongated corn treating mechanisms alined longitudinally and operative to separate trash from corn, each of the treating mechanisms having respective discharge ends in proximate and spacial relation to the discharge end of the other treating mechanism, and each of the treating mechanisms being inclined to feed the corn to its discharge end; a corn elevator transverse to the treating mechanism and positioned beneath the discharge ends for receiving corn from the treating mechanisms and including therein an elongated elevator housing having vertically disposed side walls interconnected by vertically spaced laterally disposed walls and a conveyor contained within the housing; a pair of conveyor housings having trash intake openings and rigid with and on opposite sides of the elevator housing, each of the conveyor housings including as a part thereof a portion of the vertically disposed side walls, and each of the latter portions containing perforations therein for passing kernels of corn from the conveyor housings to the elevator housing; and conveyor means within the conveyor housings operative to move the trash and incidental kernels transversely relative to the treating mechanism and adjacent the perforated portion of the side walls.

6. A corn treating unit including a pair of elongated treating mechanisms alined longitudinally and operative to separate trash from corn, each of the treating mechanisms having respective discharge ends in proximate and spacial relation to the discharge end of the other treating mechanism, and being operative to feed the corn to its discharge end; a corn discharge elevator transverse to the treating mechanisms and positioned beneath the discharge ends for receiving corn from the treating mechanisms and including therein an elongated elevator housing having vertically disposed side walls inter-connected by vertically spaced laterally disposed walls and a conveyor contained within the housing; trash conveying means including conveyor housing means rigid with the elevator housing, the conveyor housing means including as a part thereof a portion of at least one of the walls of the elevator housing containing perforations therein for passing kernels of corn from the conveyor housings to the elevator housing; conveyor means within the conveyor housing means operative to move the trash and incidental kernels transversely relative to the treating mechanism and adjacent the perforations; and hopper means beneath each of the respective pair of treating mechanisms receiving trash and the incidental kernels from the pair of treating mechanisms and feeding them to the conveyor housing means.

7. A corn treating unit including a pair of elongated treating mechanisms alined longitudinally and operative to remove trash from corn, each of the treating mechanisms having respective discharge ends in proximate and spacial relation to the discharge end of the other treating mechanism, and being operative to feed the ears to its discharge end; a corn discharge elevator transverse to the treating mechanisms and positioned beneath the discharge ends for receiving corn from the treating mechanisms; trash conveying means including conveyor housing means rigid with the elevator housing, the conveyor housing means including as a part thereof at least one wall portion common with the elevator housing containing perforations therein for passing kernels of corn from the conveyor housings to the elevator housing; conveyor means within the conveyor housing means operative to move the trash and incidental kernels transversely relative to the treating mechanism and adjacent the perforations; and hopper means beneath each of the respective pair of treating mechanisms receiving trash and the incidental kernels from the pair of treating mechanisms and feeding them to the conveyor housing means.

8. A corn treating unit including a pair of elongated treating mechanisms alined longitudinally and operative to remove trash from corn, each of the treating mechanisms having respective discharge ends in proximate and spacial relation to the discharge end of the other treating mechanism, and being operative to feed the corn to its discharge end; a corn discharge elevator transverse to the treating mechanisms and positioned beneath the discharge ends for receiving corn from the treating mechanisms; trash conveying means including conveyor housing means rigid with the elevator housing, the conveyor housing means including as a part thereof at least one wall portion containing perforations therein for passing kernels of corn from the conveyor housing means to the elevator housing; conveyor means within the conveyor housing means operative to move the trash and incidental kernels transversely relative to the treating mechanism and adjacent the perforations; and hopper means beneath each of the respective pair of treating mechanisms receiving trash and the incidental kernels from the pair of treating mechanisms and feeding them to the conveyor housing means.

9. A corn treating unit including a pair of elongated corn treating mechanisms alined longitudinally, each of the corn treating mechanisms having respective discharge ends in proximate and spacial relation to the discharge end of the other mechanism, and being operative to feed the treated corn to its discharge end and trash and incidental kernels of corn downwardly; a corn discharge elevator transverse to the mechanisms and positioned beneath the discharge ends for receiving corn from the mechanisms; trash conveying means including conveyor housing means rigid with the elevator housing, the conveyor housing means including as a part thereof at least one wall portion containing perforations therein for passing kernels of corn from the conveyor housing means to the elevator housing; conveyor means within the conveyor means operative to move the trash and incidental kernels transversely relative to the treating mechanism and adjacent the perforations, and means beneath each of the respective pair of mechanisms receiving trash and the incidental kernels from the pair of mechanisms and feeding them to the conveyor housing means.

10. Discharge means for a corn treating mechanism of the type having a main frame and an elongated corn treating unit discharging downwardly trash and incidental kernels of corn resulting from the treating operation and treated corn from the treating unit, comprising: a corn conveyor housing and an auger housing supported by the main frame, the housings having at least one common wall portion with the wall portion being perforated to permit passage of kernels of corn between the housings, the auger housing having an inlet opening upwardly for receiving the trash and kernels of corn from beneath the treating unit, and the corn conveyor housing having a material inlet opening upwardly for receiving treated corn from the treating unit and a corn discharge outlet remote from its inlet; an auger in the auger housing operative to move the trash and kernels adjacent the perforated wall portion to permit the kernels to pass through the perforated portion and into the corn conveyor housing; a conveyor in the corn conveyor housing for moving the treated corn and incidental kernels to the corn discharge outlet; and blower means supported by the main frame for directing a blast of air into the corn conveyor and over the corn for driving chaff and other foreign matter therefrom.

11. Discharge means for a corn husking mechanism of the type having a main frame, an elongated husking unit discharging downwardly husks and incidental kernels of corn resulting from the husking operation and ears of corn from at least one end of the husking unit, and blower means directing a flow of air through the husking mechanisms for removing trash therefrom, said discharge means comprising: a corn conveyor housing and an auger housing supported by the main frame, the housings having at least one common wall portion with the wall portion being perforated to permit passage of kernels of corn between the housings, the auger housing having an inlet for receiving the husks and kernels of corn from beneath the husking unit, and the corn conveyor housing having a material inlet for receiving ears of corn from the husking unit and a corn discharge outlet remote from its inlet; an auger in the auger housing operative to move the husks and kernels adjacent the perforated wall portion to permit the kernels to pass through the perforated portion and into the corn conveyor housing; a conveyor in the corn conveyor housing for moving the ears and kernels to the corn discharge outlet; and means extending from the blower means for directing a blast of air into the corn conveyor and over the corn ears and corn kernels for driving chaff and other foreign matter therefrom.

12. Discharge means for a corn treating mechanism of the type having a main frame and a treating unit discharging downwardly trash and incidental kernels of corn resulting from the treating operation and treated corn from the treating unit, comprising: a corn discharge conveyor housing and an adjacent trash discharge auger housing supported by the main frame, the housings being substantially parallel and having at least one common wall portion, the wall portion being perforated to permit passage of kernels of corn between the housings, the auger housing having a material inlet for receiving the trash and kernels of corn from the treating unit and a material outlet remote from the inlet, and the corn conveyor housing having a material inlet for receiving treated corn from the treating unit and a corn discharge end remote from its inlet; an auger in the auger housing operative to move the trash and kernels adjacent the perforated wall portion to permit the kernels to pass through the perforated portion and into the corn conveyor housing and the trash through the material outlet; a conveyor in the corn conveyor housing for moving the corn to the corn discharge end; and blower means supported by the main frame for directing a blast of air into the corn conveyor and over the corn for driving chaff and other foreign matter therefrom.

13. Corn husking mechanism comprising: housing structure having vertically disposed front and rear panels interconnected by fore-and-aft extending panel means, the housing structure having transversely spaced opposite end portions and a central portion; a pair of elongated transverse husking units mounted on the structure between the front and rear panels and extending respectively from the opposite end portions to the central portion, each of the husking units having a crop-receiving end adjacent its respective end portion and a crop discharge end adjacent the central portion, and each of the husking units being operative to discharge downwardly husks and incidental kernels of corn resulting from the husking operation and to feed ears of corn from its crop-receiving end to its discharge end; blower means mounted on the central portion of the housing structure including a main blower portion between the front and rear panels directing a flow of air over the husking units and including a blower extension positioned rearwardly of the rear panel; panel means in said housing structure forming a central hopper and a pair of outer hoppers adjacent opposite sides of the central hopper and beneath the husking units, the central hopper opening upwardly to receive the ears leaving the discharge ends of the husking units and the outer hoppers opening upwardly to receive husks from the husking units and operative to feed the husks inwardly toward the central portion of the housing structure; discharge means connected to the housing structure adjacent its central portion including a central rearwardly projecting discharge conveyor housing and a pair of rearwardly projecting outer auger housings, each of the outer housings having at least one wall portion common with the central housing, and each of the wall portions being perforated to permit passage of kernels of corn between adjacent housings, the outer auger housings having material inlets opening into and for receiving the husks and kernels of corn from the outer hopper and material outlets spaced rearwardly from the inlets, and the central conveyor housing opening into and for receiving ears of corn from the central hopper and having an elongated portion extending rearwardly from the rear panel to a remote discharge end; a pair of augers in the pair of auger housings respectively operative to move the husks and kernels adjacent the perforated wall portions to permit the kernels to pass through the portions and into the central conveyor housing; a conveyor within the central conveyor housing moving the ears and kernels to the discharge end thereof; and means between the blower extension and the central conveyor housing for directing a blast of air issuing from the blower extension over the corn ears and corn kernels for driving chaff and other foreign matter therefrom.

14. Corn husking mechanism comprising: housing structure having vertically disposed front and rear panels interconnected by fore-and-aft extending panel means, the housing structure having transversely spaced opposite end portions and a central portion; a pair of elongated transverse husking units mounted on the structure between the front and rear panels and extending respectively from the opposite end portions to the central portion, each of the husking units having a crop-receiving end adjacent its respective end portion and a crop discharge end adjacent the central portion, and each of the husking units being operative to discharge downwardly husks and incidental kernels of corn resulting from the husking operation and to feed ears of corn from its crop-receiving end to its discharge end; blower means mounted on the central portion of the housing structure including a main blower portion between the front and rear panels directing a flow of air over the husking units and including a blower extension positioned rearwardly of the rear panel; discharge means connected to the housing structure adjacent its central portion including a rearwardly projecting discharge conveyor housing and rearwardly projecting husk discharge housing means, said housing means having at least one wall portion in common with the central housing and perforated to permit passage of kernels of corn between the central housing and housing means, the husk discharge housing means opening into the housing structure for receiving the husks and kernels of corn from the husking units, and the central conveyor housing opening into and for receiving ears of corn from the husking units and having an elongated portion extending rearwardly from the rear panel to a remote discharge end; conveyor means within the housing means operative to move the husks and kernels adjacent the perforated wall portions to permit the kernels to pass through the portions and into the central conveyor housing; a conveyor within the central conveyor housing moving the ears and kernels to the discharge end thereof; and means between the blower extension and the central conveyor housing for directing a blast of air issuing from the blower extension over the corn ears and corn kernels for driving chaff and other foreign matter therefrom.

15. Corn husking mechanism comprising: housing structure having vertically disposed front and rear panels interconnected by fore-and-aft extending panel means; an elongated transverse husking unit mounted on the structure between the front and rear panels having a crop-receiving end and a crop discharge end, the husking unit being operative to discharge downwardly husks and incidental kernels of corn resulting from the husking operation and to feed ears of corn from its crop-receiving end to its discharge end; blower means mounted on the housing structure including a main blower portion between the front and rear panels directing a flow of air over the husking unit and including a blower extension positioned rearwardly of the rear panel; discharge means connected to the housing structure including a rearwardly projecting corn discharge conveyor housing and rearwardly projecting conveyor housing, said housings having perforated wall means to permit passage of kernels of corn between the corn and husk housings, the husk discharge housing opening into the housing structure for receiving the husks and kernels of corn from the husking units, and the corn conveyor housing opening into the housing structure for receiving ears of corn from the husking units and having an elongated portion extending rearwardly from the rear panel to a remote discharge end; conveyor means within the husk conveyor housing operative to move the husks and kernels adjacent the perforated wall means to permit the kernels to pass into the corn conveyor housing; a conveyor within the corn conveyor housing moving the ears and kernels to the discharge end thereof; and means between the blower extension and the central conveyor housing for directing a blast of air issuing from the blower extension over the corn ears and corn kernels for driving chaff and other foreign matter therefrom.

16. Discharge means for a crop treating unit in which the treating unit effects separation of the crop from waste material accumulated therewith, the discharge means comprising: a pair of elongated conveyor housings having a common and perforated side wall, one housing of which receives the treated crop at an intake end and the other housing of which receives the waste material at an intake end, both conveyor housings having respective discharge ends remote from their intake ends; a continuous chain type conveyor in said one housing having a discharge run effecting movement of the treated crop from its respective intake end to the discharge end and a return run; and an auger type conveyor in said other housing effecting discharge of the waste material and effective to move the waste material adjacent the perforated common wall to thereby effect passage of incidental crop particles remaining in the waste material into said one housing.

17. The invention defined in claim 16 in which the common side wall is a vertical wall defining a side of each of the housings, the discharge run is the upper run of chain conveyor and the return run is the lower run, and the perforations in the common wall are placed to permit passage of the remaining crop particles into contact with the lower return run.

References Cited in the file of this patent

UNITED STATES PATENTS

| | | |
|---|---|---|
| 1,781,472 | Nagle | Nov. 11, 1930 |
| 2,379,802 | Hyman | July 3, 1945 |
| 2,927,694 | Scranton et al. | Mar. 8, 1960 |